(12) United States Patent
Schmisseur et al.

(10) Patent No.: US 10,359,940 B2
(45) Date of Patent: *Jul. 23, 2019

(54) METHOD AND APPARATUS FOR DYNAMICALLY ALLOCATING STORAGE RESOURCES TO COMPUTE NODES

(71) Applicant: INTEL CORPORATION, Santa Clara, CA (US)

(72) Inventors: Mark A. Schmisseur, Phoenix, AZ (US); Mohan J. Kumar, Aloha, OR (US); Balint Fleischer, Groton, MA (US); Debendra Das Sharma, Saratoga, CA (US); Raj Ramanujan, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,240

(22) Filed: Nov. 7, 2017

(65) Prior Publication Data

US 2018/0157424 A1     Jun. 7, 2018

Related U.S. Application Data

(63) Continuation of application No. 14/752,812, filed on Jun. 26, 2015, now Pat. No. 9,823,849.

(51) Int. Cl.
*G06F 3/12* (2006.01)
*H04L 12/24* (2006.01)
*H04L 29/08* (2006.01)
*G06F 3/06* (2006.01)

(52) U.S. Cl.
CPC .......... *G06F 3/0608* (2013.01); *G06F 3/0604* (2013.01); *G06F 3/0607* (2013.01); *G06F 3/0631* (2013.01); *G06F 3/0644* (2013.01); *G06F 3/0665* (2013.01); *G06F 3/0685* (2013.01); *G06F 3/0688* (2013.01); *H04L 41/0896* (2013.01); *H04L 67/1097* (2013.01)

(58) Field of Classification Search
CPC .... G06F 3/0608; G06F 3/0631; G06F 3/0685; G06F 3/0644; G06F 3/0604; G06F 3/0688; G06F 3/0665; G06F 3/0607; H04L 41/0896; H04L 67/1097
See application file for complete search history.

(56) References Cited

U.S. PATENT DOCUMENTS

| | | |
|---|---|---|
| 8,082,400 B1 | 12/2011 | Chang |
| 9,772,866 B1 * | 9/2017 | Aron .................. G06F 9/45558 |
| 2005/0125538 A1 | 6/2005 | Tawil |
| 2005/0210098 A1 | 9/2005 | Nakamichi et al. |

(Continued)

OTHER PUBLICATIONS

Huffman, A., "NVM Express: Optimized Interface for PCI Express SSDs", SSDS004, .COPYRGT. 2013 Intel Corporation, 58 pp.

(Continued)

*Primary Examiner* — Rocio Del Mar Perez-Velez
(74) *Attorney, Agent, or Firm* — Compass IP Law PC

(57) ABSTRACT

Provided are a method, system, computer readable storage medium, and switch for configuring a switch to assign partitions in storage devices to compute nodes. A management controller configures the switch to dynamically allocate partitions of at least one of the storage devices to the compute nodes based on a workload at the compute node.

25 Claims, 5 Drawing Sheets

(56) References Cited

U.S. PATENT DOCUMENTS

| | | |
|---|---|---|
| 2009/0271589 A1 | 10/2009 | Karpoff |
| 2011/0060885 A1 | 3/2011 | Satoyama et al. |
| 2013/0055249 A1 | 2/2013 | Vaghani et al. |
| 2013/0198450 A1 | 8/2013 | Malwankar et al. |
| 2014/0122823 A1 | 5/2014 | Gupta et al. |
| 2014/0195634 A1 | 7/2014 | Kishore et al. |
| 2014/0223012 A1 | 8/2014 | Agarwala et al. |
| 2014/0281040 A1* | 9/2014 | Liu .......................... G06F 9/50 710/3 |
| 2014/0317206 A1 | 10/2014 | Lomelino et al. |
| 2015/0052300 A1 | 2/2015 | Piekarski |
| 2015/0254088 A1 | 9/2015 | Chou |
| 2015/0319237 A1 | 11/2015 | Hussain |
| 2017/0102874 A1 | 4/2017 | Ouchi |

OTHER PUBLICATIONS

Intel Corporation, "PCI-SIG SR-IOV/Primer—An Introduction to SR-IOV Technology", Revision 2.5, Jan. 2011, 28 pp.

International Preliminary Report on Patentability for PCT Patent Application No. PCT/US16/34483, dated Dec. 26, 2017, 11 pages.

International Search Report and Written Opinion for International Application No. PCT/US2016/034483, dated Sep. 5, 2016, 15 pp.

Morgan, T.P., "PCI Express Switching Takes on Ethernet, InfiniBand", [online], Mar. 13, 2014, [Retrieved on Apr. 22, 2015], Retrieved from the Internet at , 7 pp.

Notice of Allowance for U.S. Appl. No. 14/752,812, dated Jul. 19, 2017, 27 pages.

NVM Express, Inc., "NVM Express Explained", [online], [Retrieved Apr. 23, 2015], retrieved from the Internet at , 5 pp.

NVM Express, Inc., "NVM Express", Revision 1.2, Nov. 3, 2014, 205 pp.

NVM Express, Revision 1.1, Oct. 11, 2012.

Office Action for U.S. Appl. No. 14/752,812, dated Jan. 12, 2017, 28 pages.

Extended European Search Report for Patent Application No. 16814990.4, dated Feb. 12, 2019, 10 pagaes.

* cited by examiner

US 10,359,940 B2

METHOD AND APPARATUS FOR DYNAMICALLY ALLOCATING STORAGE RESOURCES TO COMPUTE NODES

TECHNICAL FIELD

Embodiments described herein generally relate to dynamically allocating storage resources to compute nodes in a server.

BACKGROUND

Servers in large data centers benefit from disaggregating storage resources from the computational nodes, such as the servers, to efficiently combine the storage resources into aggregated pools to be shared among the computational nodes. These pools enable higher density of servers in racks, and flexibility in how the storage resources are allocated to the computational nodes. Existing solutions to pool resources involve implementation of a Redundant Array of Independent Disks (RAID) across a collection of solid state storage devices (SSDs) and then allocation of a portion of the capacity to each attached computational node. The RAID abstraction requires node Input/Output (IO) commands to be processed by a RAID controller to create translated commands that can be sent to the SSDs. This translation by the RAID and SSD controllers add latency to I/O command processing. As the latency of SSDs reduces with new, high speed NVM technology, the added latency for RAID controller translations becomes a larger percentage of the overall I/O latency.

The NVM Express specification defines an optimized register interface, command set and feature set for PCI Express (PCIe®)-based Solid-State Drives (SSDs). The Peripheral Component Interconnect express (PCIe) bus reduces latency, provides improved Input/Output operations per second (IOPSs) and improves parallelism of SSD access. NVMe allows host software to communicate with storage subsystems in the flash memory devices.

NVMe provides for multi-path I/O that allows two or more independent PCIe paths between a single host and a namespace and provides for namespace sharing to allow two or more hosts to access a common shared namespace using different NVMe controllers. Both multi-path I/O and namespace sharing require that the NVMe subsystem contain two or more controllers. NVMe also supports Single Root I/O Virtualization (SR-IOV) that provides virtual functions to allow multiple virtual machines to access a storage device and bypass the virtual machine monitor or hypervisor layer for the I/O access.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Described embodiments provide techniques to pool storage devices to enable flexible assignment of partitions of the storage devices to host nodes to accommodate storage requirements and storage management policy requirements of the host nodes. Described embodiments may utilize architectures where each partition in the storage devices is managed by a separate device controller or virtual function to allow separate access to the partitions in one storage device by one or more host nodes. A switch may be configured to implement an assignment of the device controllers and partitions to expose only the device controllers and partitions to the host nodes that are in fact assigned to the host nodes according to the storage requirements and storage management policies for the host nodes. This arrangement allows the transfer of data and commands directly between the host nodes and storage devices through the switch using bus interface protocols and the flexible assignment of storage resources to the host nodes.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

Figure 1:
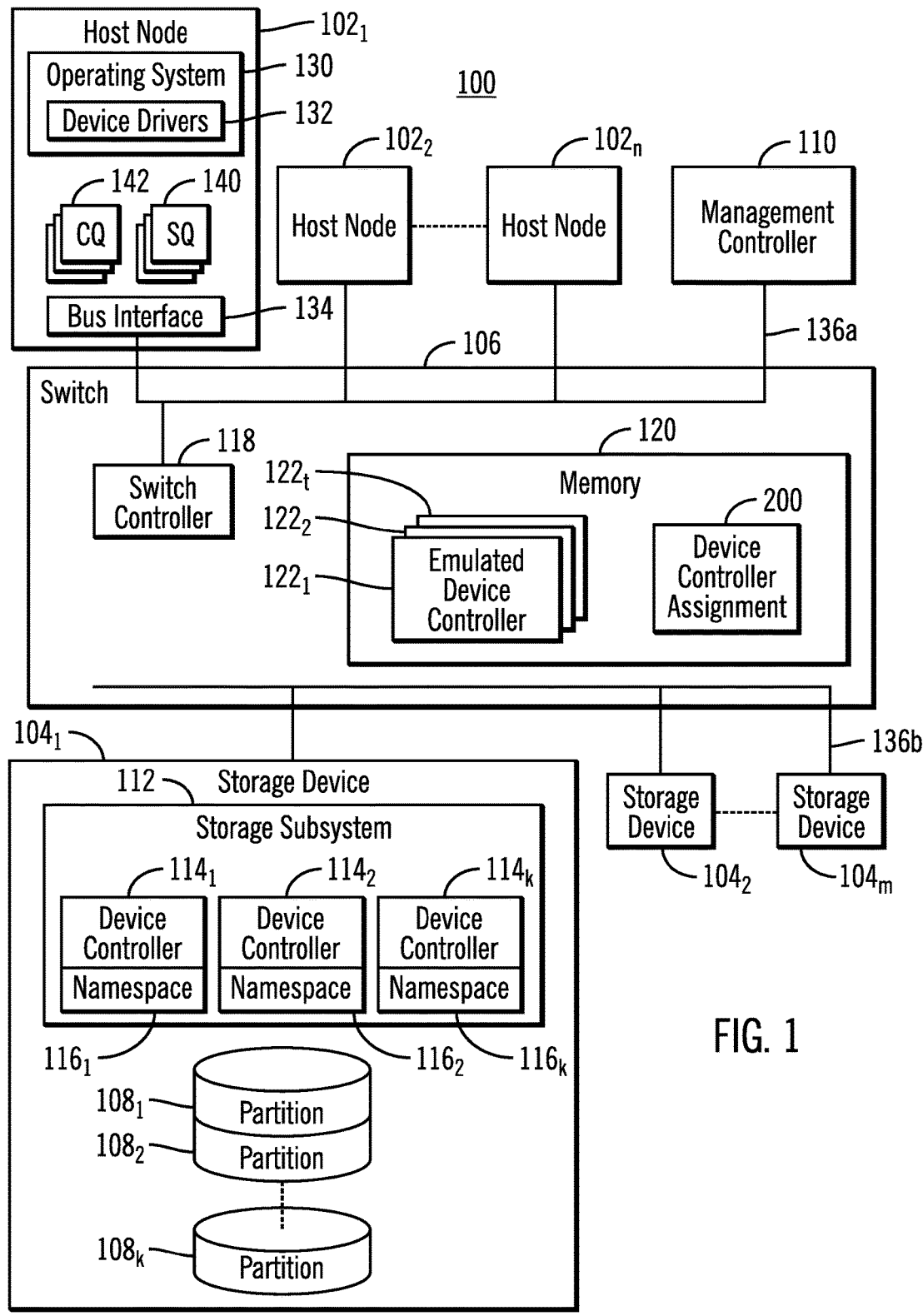
FIG. 1 illustrates an embodiment of a storage environment.

FIG. 1 illustrates an embodiment of a storage environment 100 having a plurality of host nodes $102_1$, $102_2$ ... $102_n$ that communicate with multiple storage devices $104_1$, $104_2$ ... $104_m$ via a switch 106. The address space of each of the storage devices $104_1$, $104_2$ ... $104_m$ may be divided into one or more partitions $108_1$, $108_2$ ... $108_k$, where each partition comprises a subset of addresses in a storage device $104_1$, $104_2$ ... $104_m$. The host nodes may further comprise any type of compute node capable of accessing storage partitions and performing compute operations.

The switch 106 receives an assignment of host nodes $102_1$, $102_2$ ... $102_n$ to partitions $108_1$, $108_2$ ... $108_k$ configured in the storage devices $104_1$, $104_2$ ... $104_m$ from a management controller 110 that applies storage management policies to determine how to assign partitions to the host nodes $102_1$, $102_2$ ... $102_n$ based on such factors as storage usage at the host nodes $102_1$, $102_2$ ... $102_n$, service level agreements (SLAs) specifying an amount and/or quality of storage to provide to the host nodes $102_1$, $102_2$ ... $102_n$, and other storage management policies.

Although one switch 106 is shown, further embodiments may include multiple interconnected switches, where the host nodes $102_1$, $102_2$ ... $102_n$ and storage devices $104_1$, $104_2$ ... $104_m$ may each connect to one or more of the switches.

Each of the storage devices $104_1$, $104_2$ ... $104_m$ includes components as shown with respect to storage device $104_1$, including a storage subsystem 112. Each storage subsystem 112 includes one or more device controllers $114_1$, $114_2$ ... $114_k$, one or more namespaces $116_1$, $116_2$ ... $116_n$, wherein there is one namespace for each of the partitions $108_1$, $108_2$ ... $108_k$ and the device controllers $114_1$, $114_2$ ... $114_k$, one or more bus ports (not shown, e.g., PCI Express ports), and a non-volatile storage medium comprising the partitions $108_1$, $108_2$ ... $108_k$, such as NAND storage when the storage devices $104_1$, $104_2$ ... $104_m$ comprise Solid State Drives (SSDs). Each namespace $116_1$, $116_2$ ... $116_n$ may be assigned a separate namespace identifier.

The switch 106 includes a switch controller 118 that manages the operations of the switch 106 and a memory 120. The switch controller 118 may be implemented as firmware executed by a processor. As part of initialization of the switch 106 or when adding a storage device $104_1$, $104_2$ ... $104_m$, the switch controller 118 generates an emulated device controller $122_1$, $122_2$ ... $122_t$ for each of the device controllers $114_1$, $114_2$ ... $114_k$ in the storage subsystem 112 in each of the storage devices $104_1$, $104_2$ ... $104_m$. The number of emulated device controllers "t" may comprise the sum of all the device controllers $114_1$, $114_2$ ... $114_k$ in the storage devices $104_1$, $104_2$ ... $104_m$.

The management controller 110 or some of the other components in the system, such as the switch controller 118 or storage subsystem 112, may generate the namespaces $116_1$, $116_2$ ... $116_k$ and a device controller assignment 200 based on an assignment of the storage device partitions $108_1$, $108_2$ ... $108_k$ communicated from the management controller 110. The device controller assignment 200 maps the namespaces $116_1$, $116_2$ ... $116_k$ assigned to the device controllers $114_1$, $114_2$ ... $114_k$, respectively, to the host nodes $102_1$, $102_2$ ... $102_n$. In this way, there may be a one-to-one mapping of each namespace $116_1$, $116_2$ ... $116_k$ to each of the hosts $102_1$, $102_2$ ... $102_n$.

Each of the host nodes $102_1$, $102_2$ ... $102_n$ includes, as shown with respect to host node $102_1$, an operating system 130 having device drivers 132. The device drivers 132 may include a bus interface device driver to manage communications on a bus interface 134 and a storage device driver to manage I/O requests to the storage devices $104_1$, $104_2$ ... $104_m$. In one embodiment, the bus interface device driver may implement the Peripheral Component Interconnect Express (PCIe) bus protocol and the storage device driver may implement the Nonvolatile Memory Express (NVMe) protocol for accessing the storage capacity of the storage devices $104_1$, $104_2$ ... $104_m$. The switch 106 implements bus components 136a and 136b to extend the bus interface 134 of the host nodes $102_1$, $102_2$ ... $102_n$ to the storage devices $104_1$, $104_2$ ... $104_m$, respectively. The bus components 136a and 136b represent point-to-point differential link interfaces. The host nodes $102_1$, $102_2$ ... $102_n$ may comprise servers managing storage, cloud computing services and other computing services in a computing environment. In PCIe implementations, the bus components 136a, 136b may not comprise a multi-agent bus and instead provide point-to-point connections between bus components.

Further, the switch 106 may include PCIe bridges or bus interface bridges to connect to the ports of the host nodes $102_1$, $102_2$ ... $102_n$ and storage devices $104_1$, $104_2$ ... $104_m$.

The switch 106 may expose each of the host nodes $102_1$, $102_2$ ... $102_n$ to the emulated device controllers $122_1$, $122_2$ ... $122_t$ representing the device controllers $114_1$, $114_2$ ... $114_k$ assigned to the particular host node according to the device controller assignment 200 to thereby expose the host nodes $102_1$, $102_2$ ... $102_n$ to the partitions $108_1$, $108_2$ ... $108_k$ managed by assigned controllers. In this way, may each host node $102_1$, $102_2$ ... $102_n$ is only exposed those emulated device controllers $122_1$, $122_2$ ... $122_t$ on its bus interface 134 according to the device controller assignment 200, and may only communicate with the assigned device controllers $114_1$, $114_2$ ... $114_k$ and their partitions $108_1$, $108_2$ ... $108_k$ represented by the assigned emulated device controllers $122_1$, $122_2$ ... $122_t$.

The host nodes $102_1$, $102_2$ ... $102_n$ may each generate a submission queue (SQ) 140 for each assigned device controller/namespace and generate one or more completion queues 142 to receive completion of a submission through the submission queues 140. There may be one or more submission queues per device controller/namespace. There may be additional queues, such as administrative submission and completion queues used to submit administrative commands to the storage devices $104_1$, $104_2$ ... $104_m$ that impact the storage subsystems 112. The I/O submission queues (SQ) 140 and completion queues (CQ) 142 may be used to carry out I/O (read/write) operations and may be distributed across central processing unit (CPU) cores and threads of the host nodes $102_1$, $102_2$ ... $102_n$. In this way, the device controller assignment 200 maps direct I/O requests from the host nodes $102_1$, $102_2$ ... $102_n$ to the storage device partitions $108_1$, $108_2$ ... $108_k$ via the assigned device controllers $114_1$, $114_2$ ... $114_k$. The device controller assignment 200 may map zero or more partitions/device controllers to a host node, and may map one or more host nodes to multiple partitions on the same and/or different storage devices. In this way, different host nodes may be assigned different partitions in one or more of the storage device. This provides maximum flexibility in assigning pooled storage partitions to the host nodes by allowing partitions in any of the storage devices to be assigned to any of the host nodes.

The switch 106 may maintain queues in the switch controller 118 through which commands that address the device controllers $114_1$, $114_2$ ... $114_k$ are routed so that the switch controller 118 provides emulated device controller response. The switch controller 118 may further access the device controllers $114_1$, $114_2$ ... $114_k$ in the storage devices $104_1$, $104_2$ ... $104_m$ directly to create partitions $108_1$, $108_2$ ... $108_k$ and map the partitions/namespaces to the device controllers $114_1$, $114_2$ ... $114_k$. The management controller 110, or other component, e.g., 118, 112, may configure the partitions $108_1$, $108_2$ ... $108_k$ in the storage devices $104_1$, $104_2$ ... $104_m$ based on the assignment of partitions to host nodes provided by the management controller 110.

For I/O command processing, the emulated device controllers $122_1$, $122_2$ ... $122_t$ may include a subset of I/O queues from the respective device controller and namespace. The switch controller 118 performs address translation to route host node writes and reads in the submission queues 140 to queue doorbells directly to the device controllers $114_1$, $114_2$ ... $114_k$. The switch controller 118 may use a device controller identifier associated with the namespace to route transfers from the storage devices $104_1$, $104_2$ ... $104_m$, such as Direct Memory Access (DMA) transfers, to the assigned host node $102_1$, $102_2$ ... $102_n$. If the memory address for an I/O command from one host node is identical to the memory address for an I/O command from another node when both nodes are assigned partitions in a same storage device $104_1$, $104_2$ ... $104_m$, the device controller assignment 200 allows the routing of the I/O command to the device controller assigned to the host. The device controller assignment 200 binds the namespaces to the device controllers to enable direct I/O access between the host nodes and the device controllers.

In certain NVMe embodiments, each of the device controllers $114_1$, $114_2$ ... $114_k$ may comprise virtual functions and each storage subsystem 112 may also include a physical function, where a physical function includes a full set of the PCIe capabilities and is aware of the virtual functions, and the virtual functions are a subset of functions, i.e., "lightweight" PCIe functions, needed to perform the data movement operations. The emulated device controllers $122_1$, $122_2$ ... $122_t$ provide a full PCIe Physical function view of any Virtual Function in the storage subsystem 112 to the host node $102_1$, $102_2$ ... $102_n$. The virtual functions enable the host nodes to directly access the bus interface resources. In one embodiment, the virtual functions and subsystem 112 may be implemented according to the Single Root I/O Virtualization and Sharing (SR-IOV) architecture that allow virtual machines to directly access PCI hardware resources, eliminating the virtual machine hypervisor from participating in I/O operations.

The storage devices $104_1$, $104_2$ ... $104_m$ may comprise electrically erasable and non-volatile memory cells, such as flash storage devices and solid state drives (SSDs). For instance, the storage devices $104_1$, $104_2$ ... $104_m$ may comprise an SSD of NAND dies of memory cells, also known as NAND chips or packages. In one embodiment, the NAND dies may comprise a multilevel cell (MLC) NAND flash memory that in each cell records two bit values, a lower bit value and an upper bit value. Alternatively, the NAND dies may comprise single level cell (SLC) and triple level cell (TLC) NAND memories. Yet further, the NAND dies may comprise 3D NAND flash memory using floating gate cells. The non-volatile storage medium comprising the partitions $108_1$, $108_2$ ... $108_k$ 108 in the storage device $104_1$, $104_2$ ... $104_m$ may comprise other types of memory, including, but not limited to, MLC NAND flash memory, ferroelectric random-access memory (FeTRAM), nanowire-based non-volatile memory, three-dimensional (3D) crosspoint memory such as phase change memory (PCM), memory that incorporates memristor technology, Magnetoresistive random-access memory (MRAM), Spin Transfer Torque (STT)-MRAM, a single level cell (SLC) Flash memory and other electrically erasable programmable read only memory (EEPROM) type devices. Further, the different storage devices $104_1$, $104_2$ ... $104_m$ may comprise a same or different types of storage devices.

In the embodiment of FIG. 1, the management controller 110 is shown as included in a device external to the switch 106 that communicates on the switch bus component 136a. In an alternative embodiment, the management controller 110 may be implemented within the switch 106 logic. In alternative embodiments, the management controller 110 may connect to the switch 106 using interfaces other than the bus components 136a, 136b, such as Inter-Integrated Circuit ("I2C"), System Management Bus ("SMBus"), Ethernet or any other interface implemented on the switch 106. In one embodiment, the host nodes $102_1$, $102_2$ ... $102_n$ may be implemented in one or more enclosures as physical host nodes or virtual machines that connect via a cable to an enclosure including the switch 106. The storage devices $104_1$, $104_2$ ... $104_m$ may be implemented in one or more separate enclosures that connect to the switch 106. The enclosures including the host nodes, switch and storage devices may be on the same server rack. In such embodiments, the management controller 110 may be part of a baseboard management controller that manages the components on a rack. In further embodiments, the switch 106 may connect components over additional networks to reach host nodes and storage devices.

Figure 2:
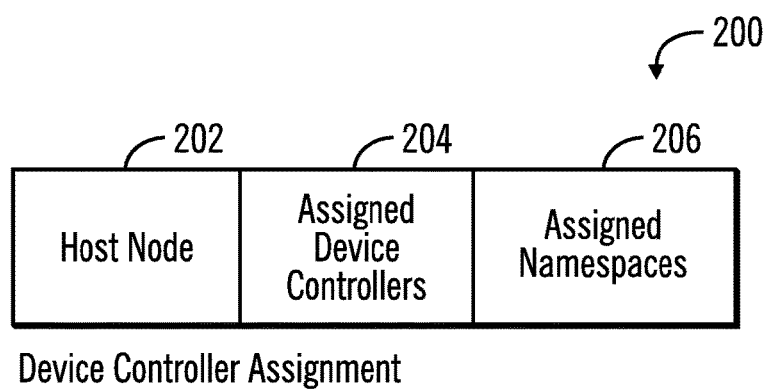
FIG. 2 illustrates an embodiment of a device controller assignment.

FIG. 2 illustrates an embodiment of the device controller assignment that indicates for each host node 202 one or more assigned device controllers 204 and the corresponding assigned namespaces 206 assigned to the host node 202, which further maps to the partitions $108_1$, $108_2$ ... $108_k$ the host node 202 may access.

Figure 3:
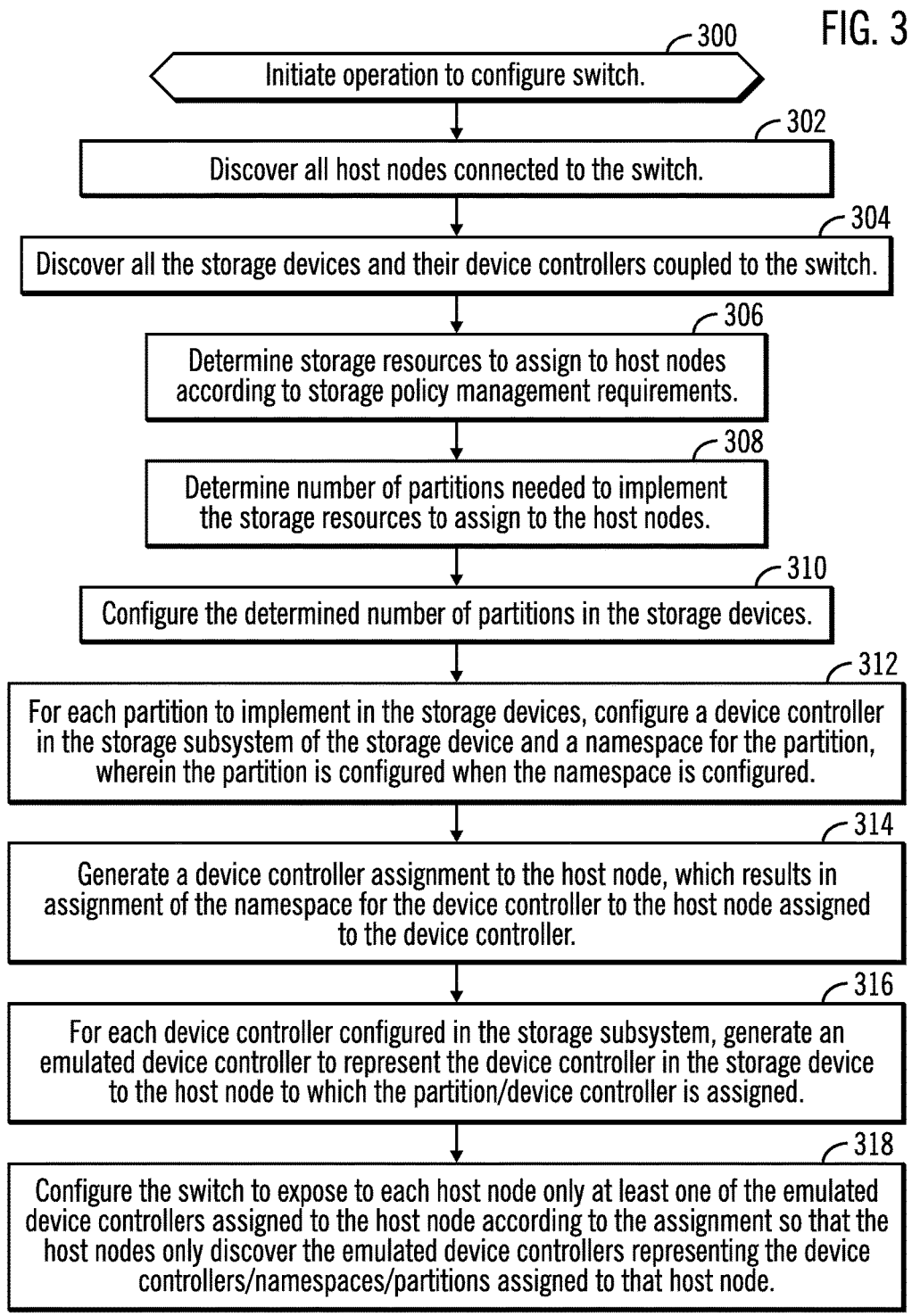
FIG. 3 illustrates an embodiment of operations to configure a switch to assign partitions in storage devices to host nodes.

FIG. 3 illustrates an embodiment of operations performed by the management controller 110 to configure the switch 106 and assign partitions $108_1$, $108_2$ ... $108_k$ to the host nodes $102_1$, $102_2$ ... $102_n$. Upon initiating the operations (at block 300) to configure the switch, the management controller 110 discovers (at block 302) all the host nodes $102_1$, $102_2$ ... $102_n$ connected to the switch 106 and discovers (at block 304) all the connected storage devices $104_1$, $104_2$ ... $104_m$. The management controller 110 determines (at block 306) storage resources to assign to the host nodes $102_1$, $102_2$ ... $102_n$ according to storage policy management requirements based on a workload at the host nodes. For instance, the storage policy management requirements may indicate a minimum amount of storage resources to assign to a host node to satisfy workload and usage requirements, or service level agreement (SLA) requirements also based on the type and amount of workload at the host nodes. For instance, if the workload is high, it may need a greater amount of partitions allocated. Further, if a host node workload has critical or important data, that host node may be more partitions in the storage devices. The management controller 110 then determines (at block 308) a number of partitions $108_1$, $108_2$ ... $108_k$ in the storage devices $104_1$, $104_2$ ... $104_m$ that are needed to implement the storage resources to assign. The determined number of partitions are then configured (at block 310) in the storage devices $104_1$, $104_2$ ... $104_m$. For each partition $108_1$, $108_2$ ... $108_k$ to implement, a device controller $114_1$, $114_2$ ... $114_k$ and namespace $116_1$, $116_2$ ... $116_n$ are configured (at block 312). In certain embodiments, the partition $108_1$, $108_2$ ... $108_k$ is created by creating the namespace $116_1$, $116_2$ ... $116_n$, as the namespace defines the storage partition.

A device controller assignment 200 is generated (at block 314) indicating an assignment of the device controller $114_1$, $114_2$ ... $114_k$ to the host node $102_1$, $102_2$ ... $102_n$, which results in the assignment of the namespace $116_1$, $116_2$ ... $116_n$ and corresponding partition $108_1$, $108_2$ ... $108_k$ to the host node $102_1$, $102_2$ ... $102_n$. In this way, the namespace is assigned to the host node through the assignment the device controller to the host node. For each device controller $114_1$, $114_2$ ... $114_k$ configured in the storage subsystem 112, the management controller 110 generates (at lock 316) an emulated device controller $122_1$, $122_2$ ... $122_t$ to represent the device controller $114_1$, $114_2$ ... $114_k$ in the storage device $104_1$, $104_2$ ... $104_m$ to the host node $102_1$, $102_2$ ... $102_n$ to which the partition/device controller is assigned. The management controller 110 configures (at block 318) the switch 106 to expose to each host node $102_1$, $102_2$ ... $102_n$ only at least one of the emulated device controllers $122_1$, $122_2$ ... $122_t$ assigned to the host node according to the assignment 200, so that the host nodes $102_1$, $102_2$ ... $102_n$ only discover the emulated device controllers $122_1$, $122_2$ ... $122_t$ representing the device controllers/namespaces/partitions assigned to that host node $102_1$, $102_2$ ... $102_n$.

Figure 4:
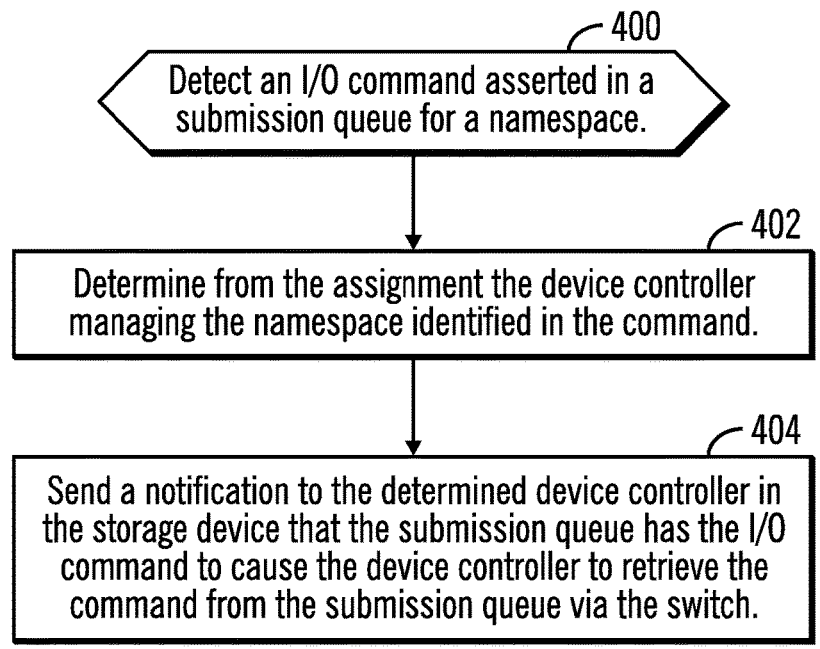
FIG. 4 illustrates an embodiment of operations to process an Input/Output (I/O) command added to a submission queue in a host node.

FIG. 4 illustrates an embodiment of operations performed by the switch controller 118 to process I/O commands asserted in a submission queue 140 after being configured according to the operations of FIG. 3. The host nodes $102_1$, $102_2$ ... $102_n$ may assert an I/O command in the submission queue 140 by asserting a read or write doorbell on the bus interface 134. Upon detecting (at block 400) the assertion of an I/O command, the switch controller 118 determines (at block 402) from the device controller assignment 200 the device controller $114_1$, $114_2$ ... $114_k$ in one of the storage devices $104_1$, $104_2$ ... $104_m$ managing the namespace identified in the command. The switch controller 118 sends (at block 404) a notification to the determined device controller $114_1$, $114_2$ ... $114_k$ in the storage device $104_1$, $104_2$ ... $104_m$ that the submission queue 140 has the I/O command, which triggers the device controller $104_1$, $104_2$ ... $104_m$ to retrieve the command from the submission queue 140 via the switch 106.

Figure 5:
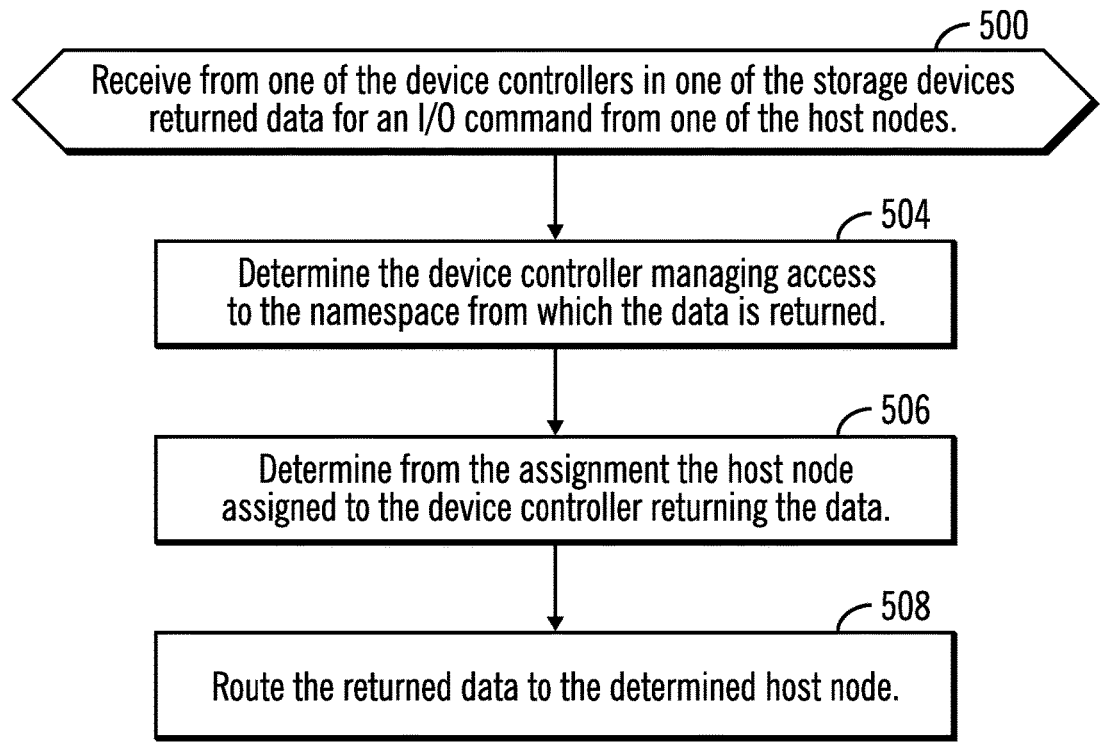
FIG. 5 illustrates an embodiment to process returned data from a storage device.

FIG. 5 illustrates an embodiment of operations performed by the switch controller 118 to process returned data received from device controller $114_1$, $114_2$ ... $114_k$. Upon receiving (at block 500) returned data for an I/O command from one of the storage devices $104_1$, $104_2$ ... $104_m$, the switch controller 118 determines (at block 504) the device controller $114_1$, $114_2$ ... $114_k$ managing access to the namespace from which the data is returned. The device controller may be determined from a PCIe function identifier (ID).

The switch controller 118 determines (at block 506) from the device controller assignment 200 the host node assigned to the device controller $114_1$, $114_2$ ... $114_k$ returning the data. The returned data is then routed (at block 508) to the determined host node and a completion from the device controller $114_1$, $114_2$ ... $114_k$ is also routed the same way as the returned data to the host node.

The operations performed by the switch controller 118 may be implemented in logic gates performing address routing of PCIe commands from the host ports to the storage device ports on the bus interfaces 136a, 136b. In alternative embodiments, the switch controller 118 operations may be implemented by a processor executing firmware or software.

Figure 6:
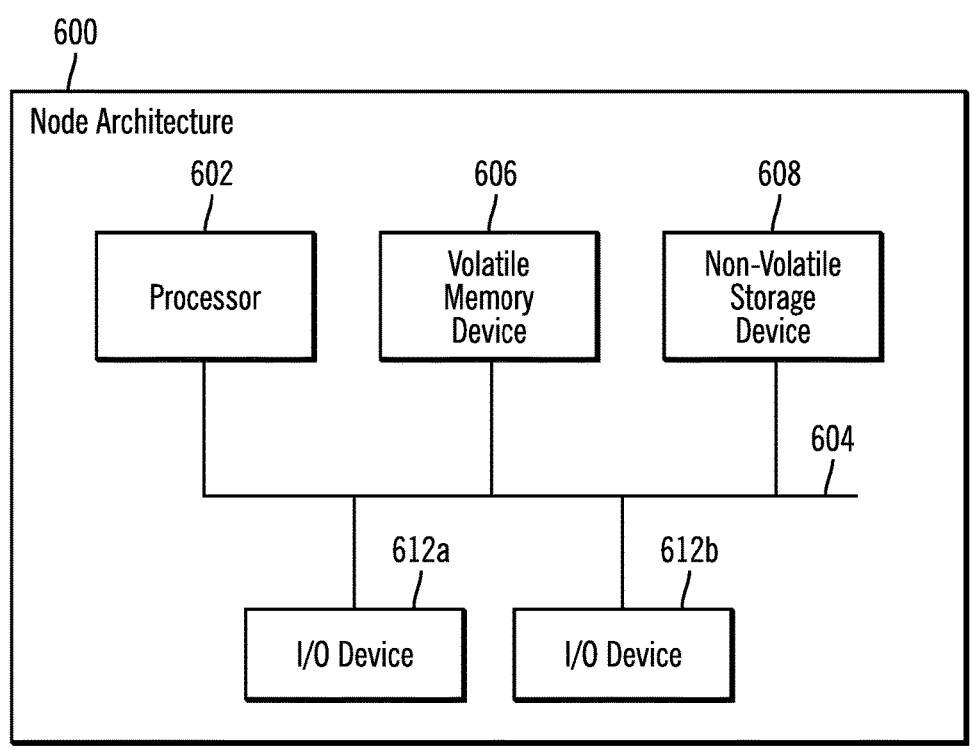
FIG. 6 illustrates an embodiment of a computer node architecture in which components may be implemented

FIG. 6 illustrates an embodiment of a computer node architecture 600, such as the components included in the host nodes $102_1$, $102_2$ ... $102_n$ and the switch 106, including a processor 602 that communicates over a bus 604, such as bus components 134, 136a, 136b, with a volatile memory device 606 in which programs, operands and parameters being executed are cached, and a non-volatile storage device 608. The bus 604 may comprise multiple buses. Further, the bus 604 may comprise a multi-agent bus or not be a multi-agent bus, and instead provide point-to-point connections according to PCIe architecture. The processor 602 may also communicate with Input/Output (I/O) devices 612a, 612b, which may comprise input devices, display devices, graphics cards, ports, network interfaces, etc. For the host nodes $102_1$, $102_2$ ... $102_n$ implementing the architecture of FIG. 6, the emulated device controllers $122_1$, $122_2$ ... $122_t$ may also appear on the bus 804 as bus components.

The reference characters used herein, such as i, j, k, m, n, and t are used to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

EXAMPLES

The following examples pertain to further embodiments.

Example 1 is a an apparatus for configuring a switch coupled to a plurality of compute nodes and a plurality of storage devices, comprising a management controller to configure the switch to dynamically allocate partitions of at least one of the storage devices to the compute nodes based on a workload at the compute node.

In Example 2, the subject matter of Examples 1 and 3-15 can optionally include that the configuring the switch to dynamically allocate partitions further comprises: determining partitions in the storage devices to assign to the host nodes; for each of the host nodes assigned at least one partition, generating an assignment of at least one device controller managing the at least one assigned partition to the host node to which the at least one partition is assigned; and configuring the switch to expose to each of the host nodes assigned at least one partition the at least one device controller managing the at least one partition assigned to the host node, wherein each of the device controllers assigned to the host node are discovered by the host node as target devices on a bus interface on which the host node communicates.

In Example 3, the subject matter of Examples 1, 2 and 4-15 can optionally include that the host nodes use bus interface commands to communicate with the device controllers in the storage devices assigned to the host nodes to access the partitions managed by the device controllers that are assigned to the host nodes.

In Example 4, the subject matter of Examples 1, 2 and 4-15 can optionally include that the configuring the switch to dynamically allocate partitions further comprises processing storage policy management requirements for the host nodes to determine partitions in the storage devices to assign to the host nodes to satisfy the storage policy management requirements.

In Example 5, the subject matter of Examples 1-4 and 6-15 can optionally include that the configuring the switch causes the switch to perform: processing from one of the host nodes a command indicating an address subject to the command and a device controller identifier of the device controller managing the partition including the address subject to the command; and routing the command to the determined device controller function in the storage device to which the address in the command maps.

In Example 6, the subject matter of Examples 1-5 and 7-15 can optionally include that the assignment of the device controllers representing different partitions comprises at least one of: an assignment of partitions in one of the storage device to different host nodes to allow the different host nodes to access different partitions in one of the storage devices; and an assignment of partitions in different storage devices to one of the host nodes to allow the host node to access the partitions in different of the storage devices.

In Example 7, the subject matter of Examples 1-6 and 8-15 can optionally include that the configuring the switch to dynamically allocate partitions further comprise configuring in the switch an emulated device controller for each of the device controllers in the storage devices, wherein the host nodes are exposed to the device controllers by exposing to the host nodes at least one of the emulated device controllers representing the at least one device controller assigned to the host node, wherein the host is only exposed to the emulated device controllers representing device controllers assigned to the host node and not exposed to emulated device controllers of device controllers not assigned to the host node, wherein the exposing of the emulated device controllers causes the switch to route host node commands directed to the emulated device controllers to the device controllers in the storage devices represented by the emulated device controllers.

In Example 8, the subject matter of Examples 1-7 and 9-15 can optionally include that the emulated device controllers emulate at least one of a physical function or virtual function of the device controllers in the storage devices.

In Example 9, the subject matter of Examples 1-8 and 10-14 can optionally include that the device controllers configured in the storage devices comprise virtual functions in storage subsystems of the storage devices, wherein a controller in each of the storage devices include a physical function, wherein the storage subsystem of each of the storage devices includes a physical function having a full set of bus functions to manage communications on the bus interface, and wherein each of the virtual functions have a lightweight set of the bus interface functions to perform data movement operations with respect to the partitions assigned to the virtual functions.

In Example 10, the subject matter of Examples 1-9 and 11-15 can optionally include that the storage devices comprise solid state storage drives, wherein the virtual functions in the storage devices implement a Single Root Input/Output Virtualization and Sharing architecture and one physical function.

In Example 11, the subject matter of Examples 1-10 and 12-15 can optionally include that the host nodes issue Input/Output (I/O) commands over a PCIe bus interface using a Non-Volatile Memory express (NVMe) protocol.

In Example 12, the subject matter of Examples 1-11 and 13-15 can optionally include that the configuring the switch causes the switch to perform: detecting that one of the host nodes included an I/O command in a submission queue for one of the device controllers indicating an address to which the command is directed; determining the device controller in one of the storage devices associated with the indicated address; and sending a notification to the determined device controller in the storage device that the submission queue has the I/O command to cause the device controller to retrieve the command from the submission queue via the switch.

In Example 13, the subject matter of Examples 1-12 and 14-15 can optionally include that the address includes a namespace identifier of a namespace to which the I/O command is directed and a block of addresses in the namespace to which the I/O command applies, wherein the namespace comprises a collection of logical blocks in one of the partitions configured in the storage devices, wherein each of the device controllers are associated with one of a plurality of namespaces in the storage devices, and wherein determining the device controller associated with the indicated address comprises determining the device controller assigned to the namespace identifier indicated in the I/O command.

In Example 14, the subject matter of Examples 1-13 and 15 can optionally include that the configuring the switch causes the switch to perform: receiving, from one of the device controllers in one of the storage devices, returned data for an I/O command from one of the host nodes; determining from the assignment the host node assigned to the device controller returning the data; and routing the returned data to the determined host node.

In Example 15, the subject matter of Examples 1-14 can optionally include that the returned data for the I/O command indicates a namespace from which the data was read, wherein a namespace comprises a collection of logical blocks in one of the partitions configured in the storage devices, wherein each of the device controllers are associated with one of the namespaces in the storage devices, and wherein determining the device controller associated with the indicated address comprises determining the device controller assigned to the namespace provided with the returned data.

Example 16 is a switch coupled to a plurality of compute nodes, a plurality of storage devices, and a management controller, comprising a switch controller to receive a configuration from the management controller to configure the switch to dynamically allocate partitions of at least one of the storage devices to the compute nodes based on a workload at the compute node.

In Example 17, the subject matter of Examples 16 and 18-20 can optionally include that the switch controller is configured to dynamically allocate partitions by further performing: for each of the compute nodes assigned at least one partition in the storage devices, generating an assignment of at least one device controller managing the at least one assigned partition to the compute node to which the at least one partition is assigned; and exposing each of the compute nodes assigned at least one partition the at least one device controller managing the at least one partition assigned to the compute node, wherein each of the device controllers assigned to the compute node are discovered by the compute node as target devices on a bus interface on which the compute node communicates.

In Example 18, the subject matter of Examples 16, 17, 19, and 20 can optionally include that the switch controller is configured to dynamically allocate partitions by further performing: processing from one of the host nodes a command indicating an address subject to the command and a device controller identifier of the device controller managing the partition including the address subject to the command; and routing the command to the determined device controller function in the storage device to which the address in the command maps.

In Example 19, the subject matter of Examples 16-18 and 20 can optionally include that the switch controller is configured to dynamically allocate partitions by further performing generating an emulated device controller for each of the device controllers in the storage devices, wherein the host nodes are exposed to the device controllers by exposing to the host nodes at least one of the emulated device controllers representing the at least one device controller assigned to the host node, wherein the host is only exposed to the emulated device controllers representing device controllers assigned to the host node and not exposed to emulated device controllers of device controllers not assigned to the host node, wherein the exposing of the emulated device controllers causes the switch to route host node commands directed to the emulated device controllers to the device controllers in the storage devices represented by the emulated device controllers.

In Example 20, the subject matter of Examples 15-19 can optionally include that the operations further comprise: detecting that one of the host nodes included an I/O command in a submission queue for one of the device controllers indicating an address to which the command is directed; determining the device controller in one of the storage devices associated with the indicated address; and sending a notification to the determined device controller in the storage device that the submission queue has the I/O command to cause the device controller to retrieve the command from the submission queue via the switch.

Example 21 is a method for managing a switch that is coupled to a plurality of compute nodes and a plurality of storage devices, comprising configuring, by a management controller, the switch to dynamically allocate partitions of at least one of the storage devices to the compute nodes based on a workload at the compute node.

In Example 22, the subject matter of Example 21 can optionally include at least one of the steps of:

(1) determining partitions in the storage devices to assign to the compute nodes; for each of the compute nodes assigned at least one partition, generating an assignment of at least one device controller managing the at least one assigned partition to the compute node to which the at least one partition is assigned; and configuring the switch to expose to each of the compute nodes assigned at least one partition the at least one device controller managing the at least one partition assigned to the compute node, wherein each of the device controllers assigned to the compute node are discovered by the compute node as target devices on a bus interface on which the compute node communicates; and/or (2) wherein the compute nodes use bus interface commands to communicate with the device controllers in the storage devices assigned to the compute nodes to access the partitions managed by the device controllers that are assigned to the compute nodes; and/or (3) processing storage policy management requirements for the compute nodes to determine partitions in the storage devices to assign to the compute nodes to satisfy the storage policy management requirements; and/or (4) wherein the configuring the switch causes the switch to perform: processing from one of the compute nodes a command indicating an address subject to the command and a device controller identifier of the device controller managing the partition including the address subject to the command; and routing the command to the determined device controller function in the storage device to which the address in the command maps; and/or (5) wherein the assignment of the device controllers representing different partitions comprises at least one of: an assignment of partitions in one of the storage device to different compute nodes to allow the different compute nodes to access different partitions in one of the storage devices; and an assignment of partitions in different storage devices to one of the compute nodes to allow the compute node to access the partitions in different of the storage devices; and/or (6) configuring in the switch an emulated device controller for each of the device controllers in the storage devices, wherein the compute nodes are exposed to the device controllers by exposing to the compute nodes at least one of the emulated device controllers representing the at least one device controller assigned to the compute node, wherein the host is only exposed to the emulated device controllers representing device controllers assigned to the compute node and not exposed to emulated device controllers of device controllers not assigned to the compute node, wherein the exposing of the emulated device controllers causes the switch to route compute node commands directed to the emulated device controllers to the device controllers in the storage devices represented by the emulated device controllers; and/or (7) wherein the emulated device controllers emulate at least one of a physical function or virtual function of the device controllers in the storage devices; and/or (8) wherein the device controllers configured in the storage devices comprise virtual functions in storage subsystems of the storage devices, wherein a controller in each of the storage devices include a physical function, wherein the storage subsystem of each of the storage devices includes a physical function having a full set of bus functions to manage communications on the bus interface, and wherein each of the virtual functions have a lightweight set of the bus interface functions to perform data movement operations with respect to the partitions assigned to the virtual functions; and/or (9) wherein the storage devices comprise solid state storage drives, wherein the virtual functions in the storage devices implement a Single Root Input/Output Virtualization and Sharing architecture and one physical function; and/or

(10) wherein the compute nodes issue Input/Output (I/O) commands over a PCIe bus interface using a Non-Volatile Memory express (NVMe) protocol; and/or

(11) wherein the configuring the switch causes the switch to perform: detecting that one of the compute nodes included an I/O command in a submission queue for one of the device controllers indicating an address to which the command is directed; determining the device controller in one of the storage devices associated with the indicated address; and sending a notification to the determined device controller in the storage device that the submission queue has the I/O command to cause the device controller to retrieve the command from the submission queue via the switch; and/or

(12) wherein the address includes a namespace identifier of a namespace to which the I/O command is directed and a block of addresses in the namespace to which the I/O command applies, wherein the namespace comprises a collection of logical blocks in one of the partitions configured in the storage devices, wherein each of the device controllers are associated with one of a plurality of namespaces in the storage devices, and wherein determining the device controller associated with the indicated address comprises determining the device controller assigned to the namespace identifier indicated in the I/O command; and/or

(13) wherein the configuring the switch causes the switch to perform: receiving, from one of the device controllers in one of the storage devices, returned data for an I/O command from one of the compute nodes; determining from the assignment the compute node assigned to the device controller returning the data; and routing the returned data to the determined compute node; and/or

(14) wherein the returned data for the I/O command indicates a namespace from which the data was read, wherein a namespace comprises a collection of logical blocks in one of the partitions configured in the storage devices, wherein each of the device controllers are associated with one of the namespaces in the storage devices, and wherein determining the device controller associated with the indicated address comprises determining the device controller assigned to the namespace provided with the returned data.

Example 23 is a system comprising: a plurality of compute nodes; a plurality of storage devices; a switch coupled to the compute nodes and the storage devices; a management controller coupled to the switch and executing program code to: configure the switch to dynamically allocate partitions of at least one of the storage devices to the compute nodes based on a workload at the compute node.

In Example 24, the subject matter of claim 23 can optionally include that the configuring the switch to dynamically allocate partitions further comprises: determining partitions in the storage devices to assign to the compute nodes; for each of the compute nodes assigned at least one partition, generating an assignment of at least one device controller managing the at least one assigned partition to the compute node to which the at least one partition is assigned; and configuring the switch to expose to each of the compute nodes assigned at least one partition the at least one device controller managing the at least one partition assigned to the compute node, wherein each of the device controllers assigned to the compute node are discovered by the compute node as target devices on a bus interface on which the compute node communicates.

Example 25 is an apparatus for configuring a switch coupled to a plurality of compute nodes and a plurality of storage devices, comprising: means for configuring the switch to dynamically allocate partitions of at least one of the storage devices to the compute nodes based on a workload at the compute node.

In Example 26, the subject matter of claim 25 can optionally include means for determining partitions in the storage devices to assign to the compute nodes; means for generating, for each of the compute nodes assigned at least one partition, an assignment of at least one device controller managing the at least one assigned partition to the compute node to which the at least one partition is assigned; and means for configuring the switch to expose to each of the compute nodes assigned at least one partition the at least one device controller managing the at least one partition assigned to the compute node, wherein each of the device controllers assigned to the compute node are discovered by the compute node as target devices on a bus interface on which the compute node communicates.

Example 27 is an apparatus comprising means to perform a method as claimed in any preceding example 1-24.

Example 28 comprises machine-readable storage including machine-readable instructions, when executed, to implement a method or realize an apparatus or system as described in any of Examples 21-26.

What is claimed is:

1. An apparatus comprising:
a management controller coupled with a switch, the switch coupled with a plurality of compute nodes and a plurality of storage devices, the management controller to:
separately assign one or more partitions in the plurality of storage devices to respective compute nodes from among the plurality of compute nodes based on one or more storage management policies;
cause the separately assigned one or more partitions to be configured in the plurality of storage devices such that separate device controllers are arranged to manage each of the separately assigned one or more partitions, at least one storage device including multiple device controllers arranged to manage multiple separately assigned one or more partitions;
cause emulated device controllers to be configured in the switch that emulate respective device controllers in the plurality of storage devices;
cause the plurality of compute nodes to be exposed to the respective device controllers by exposing each compute node to at least one emulated device controller in the switch such that indications of compute node input/output commands directed to emulated device controllers in the switch are routed to the respective device controllers in the plurality of storage devices.

2. The apparatus of claim 1, the management controller to separately assign the one or more partitions in the plurality of storage devices to respective compute nodes further comprises the management controller to:
generate a separate assignment of each respective compute node to at least one device controller arranged to manage one or more partitions in a storage device from among the plurality of storage devices; and
the separate assignment of each respective compute node to cause each emulated device controller in the switch that emulates each respective device controller to be discovered by each respective compute node as a target device on a bus interface coupled with each respective compute node.

3. The apparatus of claim 2, comprising each respective compute node to use bus interface commands for input/ output commands directed to emulated device controllers in the switch to enable each respective compute node to access the one or more partitions managed by the at least one device controller assigned to each respective compute node.

4. The apparatus of claim 2, the separate assignment of the one or more partitions to the respective compute nodes comprises:
a first assignment of partitions in a storage device of the plurality of storage devices to different compute nodes to allow the different compute nodes to access different partitions in the storage device; and
a second assignment of partitions in different storage devices to a compute node of the plurality of compute nodes to allow the compute node to access the partitions in different storage devices.

5. The apparatus of claim 2, exposing each compute node to at least one emulated device controller comprises the management controller to expose each compute node of the plurality of compute nodes to only emulated device controllers emulating respective device controllers arranged to manage respective one or more partitions assigned to each compute node.

6. The apparatus of claim 5, comprising the emulated device controllers to emulate at least one of a physical function or a virtual function of the respective device controllers.

7. The apparatus of claim 2, the separate device controllers that are arranged to manage each of the separately assigned one or more partitions comprise virtual functions in storage subsystems of the plurality of storage devices, wherein a controller in each of the plurality of storage devices includes a physical function having a full set of bus interface functions to receive notifications of compute node input/output commands sent through the bus interface, and wherein each of the virtual functions have a lightweight set of the bus interface functions to perform data movement operations with respect to the separately assigned one or more partitions for which the virtual functions were configured to manage.

8. The apparatus of claim 7, the plurality of storage devices comprise solid state storage drives, the virtual functions to implement a Single Root Input/Output Virtualization and Sharing architecture.

9. The apparatus of claim 2, comprising the compute node input/output commands directed to emulated device controllers in the switch are directed through the bus interface, wherein the bus interface is a Peripheral Component Interconnect Express (PCIe) bus interface using a Non-Volatile Memory Express (NVMe) protocol.

10. The apparatus of claim 1, the management controller to separately assign one or more partitions in the plurality of storage devices to respective compute nodes from among the plurality of compute nodes based on the one or more storage management policies, comprises the management controller to:
process storage policy management requirements for the one or more storage management polices to determine what partitions in the plurality of storage devices to separately allocate to individual compute nodes from among the plurality of compute nodes.

11. An apparatus comprising:
a switch controller for a switch, the switch coupled with a plurality of compute nodes, a plurality of storage devices, and a management controller, the switch controller to:
receive, from the management controller, a first configuration request to cause one or more partitions in the plurality of storage devices to be configured, the one or more partitions separately assigned to respective compute nodes from among the plurality of compute nodes by the management controller based on one or more storage management policies, the one or more partitions configured such that separate device controllers are arranged to manage each of the separately assigned one or more partitions, at least one storage device including multiple device controllers arranged to manage multiple separately assigned one or more partitions;
receive, from the management controller, a configuration request to configure emulated device controllers in the switch that emulate respective device controllers in the plurality of storage devices, the configuration request to cause the switch controller to expose the plurality of compute nodes to the respective device controllers by exposing each compute node to at least one emulated device controller in the switch such that indications of compute node input/output commands directed to emulated device controllers in the switch are routed to the respective device controllers in the plurality of storage devices.

12. The apparatus of claim 11, the switch controller to configure the one or more partitions, comprises the switch controller to:
generate a separate assignment of each respective compute node to at least one device controller arranged to manage one or more partitions in a storage device from among the plurality of storage devices; and
the separate assignment of each respective compute node to cause each emulated device controller in the switch that emulates each respective device controller to be discovered by each respective compute node as a target device on a bus interface coupled with each respective compute node.

13. The apparatus of claim 12, further comprising the switch controller to:
detect that a compute node from among the plurality of compute nodes has included a compute node input/output command in a submission queue for a device controller from among the respective device controllers, the compute node input/output command indicating an address to which the compute node input/output command is directed;
determine the device controller in a storage device of the plurality of storage devices associated with the indicated address; and
send a notification to the determined device controller in the storage device that the submission queue has the compute node input/output command to cause the device controller to retrieve the compute node input/output command from the submission queue via the switch.

14. The apparatus of claim 13, comprising the address to include a namespace identifier of a namespace to which the compute node input/output command is directed and to include a block of addresses in the namespace to which the compute node input/output command applies.

15. The apparatus of claim 14, the namespace comprises a collection of logical blocks in a configured partition of the storage device, wherein each of the respective device controllers are associated with a namespace of a plurality of namespaces in the plurality of storage devices and wherein the switch controller to determine the device controller associated with the indicated address includes the switch controller to determine the device controller assigned to the namespace identifier indicated in the compute node input/output command.

16. The apparatus of claim 12, further comprising the switch controller to:
receive, from a device controller of the respective device controllers in a storage device of the plurality of storage devices, returned data for a compute node input/output command;
determine the compute node assigned to the device controller based on the separate assignments of one or more partitions to the respective compute nodes; and
route the returned data to the determined compute node.

17. The apparatus of claim 16, comprises the returned data to include an indication of a namespace from which data was read, the namespace to include a collection of logical blocks in a partition configured in the storage device, wherein each of the respective device controllers are associated with a namespace of a plurality of namespaces in the plurality of storage devices and wherein the switch controller to determine the device controller associated with the returned data includes the switch controller to determine the device controller assigned to the namespace indicated in the compute node input/output command.

18. A method for managing a switch that is coupled to a plurality of compute nodes and a plurality of storage devices, comprising:
separately assigning one or more partitions in the plurality of storage devices to respective compute nodes from among the plurality of compute nodes based on one or more storage management policies;
causing the separately assigned one or more partitions to be configured in the plurality of storage devices such that separate device controllers are arranged to manage each of the separately assigned one or more partitions, at least one storage device including multiple device controllers arranged to manage multiple separately assigned one or more partitions;
causing emulated device controllers to be configured in the switch that emulate respective device controllers in the plurality of storage devices;
causing the plurality of compute nodes to be exposed to the respective device controllers by exposing each compute node to at least one emulated device controller in the switch such that indications of compute node input/output commands directed to emulated device controllers in the switch are routed to the respective device controllers in the plurality of storage devices.

19. The method of claim 18, separately assigning the one or more partitions in the plurality of storage devices to respective compute nodes further comprises:
generating a separate assignment of each respective compute node to at least one device controller arranged to manage one or more partitions in a storage device from among the plurality of storage devices, the separate assignment of each respective compute node to cause each emulated device controller in the switch that emulates each respective device controller to be discovered by each respective compute node as a target device on a bus interface coupled with each respective compute node.

20. The method of claim 19, comprising each respective compute node to use bus interface commands for compute node input/output commands directed to emulated device controllers in the switch to enable each respective compute node to access the one or more partitions managed by the at least one device controller assigned to each respective compute node.

21. A system comprising:
a plurality of compute nodes;
a plurality of storage devices;
a switch coupled with the plurality of compute nodes and the plurality of storage devices; and
a management controller coupled with the switch, the management controller to:
separately assign one or more partitions in the plurality of storage devices to respective compute nodes from among the plurality of compute nodes based on one or more storage management policies;
cause the separately assigned one or more partitions to be configured in the plurality of storage devices such that separate device controllers are arranged to manage each of the separately assigned one or more partitions, at least one storage device including multiple device controllers arranged to manage multiple separately assigned one or more partitions;
cause emulated device controllers to be configured in the switch that emulate respective device controllers in the plurality of storage devices;
cause the plurality of compute nodes to be exposed to the respective device controllers by exposing each compute node to at least one emulated device controller in the switch such that indications of compute node input/output commands directed to emulated device controllers in the switch are routed to the respective device controllers in the plurality of storage devices.

22. The system of claim 21, the management controller to separately assign the one or more partitions in the plurality of storage devices to respective compute nodes further comprises the management controller to:
generate a separate assignment of each respective compute node to at least one device controller arranged to manage one or more partitions in a storage device from among the plurality of storage devices; and
the separate assignment of each respective compute node to cause each emulated device controller in the switch that emulates each respective device controller to be discovered by each respective compute node as a target device on a bus interface coupled with each respective compute node.

23. The system of claim 22, comprising each respective compute node to use bus interface commands for compute node input/output commands directed to emulated device controllers in the switch to enable each respective compute node to access the one or more partitions managed by the at least one device controller assigned to each respective compute node.

24. The system of claim 22, the separate device controllers that are arranged to manage each of the separately assigned one or more partitions comprise virtual functions in storage subsystems of the plurality of storage devices, wherein a controller in each of the plurality of storage devices includes a physical function having a full set of bus interface functions to receive notifications of input/output commands sent through the bus interface, and wherein each of the virtual functions have a lightweight set of the bus interface functions to perform data movement operations with respect to the separately assigned one or more partitions for which the virtual functions were configured to manage.

25. The system of claim 24, the plurality of storage devices comprise solid state storage drives, the virtual functions to implement a Single Root Input/Output Virtualization and Sharing architecture.

* * * * *